(12) United States Patent
Zvibel (10) Patent No.: US 8,473,816 B2
(45) Date of Patent: *Jun. 25, 2013

(54) DATA VERIFICATION USING CHECKSUM SIDEFILE

(75) Inventor: Liran Zvibel, Tel Aviv (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/534,397

(22) Filed: Jun. 27, 2012

(65) Prior Publication Data

US 2013/0060741 A1    Mar. 7, 2013

Related U.S. Application Data

(63) Continuation of application No. 13/224,176, filed on Sep. 1, 2011.

(51) Int. Cl.
*G11C 29/00*    (2006.01)
*H03M 13/00*    (2006.01)

(52) U.S. Cl.
USPC .......................................... 714/766; 714/758

(58) Field of Classification Search
USPC .................................. 714/766, 758
See application file for complete search history.

(56) References Cited

U.S. PATENT DOCUMENTS

| | | | |
|---|---|---|---|
| 5,592,618 A * | 1/1997 | Micka et al. ..................... | 714/54 |
| 6,510,488 B2 | 1/2003 | Lasser | |
| 6,711,168 B1 | 3/2004 | Yoshizawa et al. | |
| 6,754,870 B2 | 6/2004 | Yoshida et al. | |
| 6,868,517 B1 | 3/2005 | Feng et al. | |
| 7,062,704 B2 | 6/2006 | Talagala et al. | |
| 7,093,139 B2 | 8/2006 | Silverbrook et al. | |
| 7,415,653 B1 | 8/2008 | Bonwick et al. | |
| 8,103,939 B2 * | 1/2012 | Torigoe et al. ................. | 714/766 |
| 8,122,322 B2 * | 2/2012 | Miller ............................ | 714/766 |
| 8,255,741 B2 * | 8/2012 | Cypher et al. ................ | 714/6.11 |
| 2001/0025360 A1 * | 9/2001 | Kakuta et al. ................. | 714/769 |
| 2002/0038443 A1 * | 3/2002 | Iwata et al. .................... | 714/766 |
| 2002/0138804 A1 | 9/2002 | Sangha et al. | |
| 2003/0028723 A1 | 2/2003 | Segev et al. | |
| 2003/0149929 A1 * | 8/2003 | White ........................... | 714/766 |
| 2004/0049727 A1 * | 3/2004 | Wang ............................ | 714/766 |
| 2004/0243885 A1 | 12/2004 | James et al. | |
| 2005/0015700 A1 * | 1/2005 | Hetzler et al. ................ | 714/766 |
| 2005/0132263 A1 * | 6/2005 | Anderson et al. ............. | 714/766 |
| 2006/0053361 A1 * | 3/2006 | Kim .............................. | 714/766 |
| 2007/0220402 A1 * | 9/2007 | Hagi et al. .................... | 714/766 |

(Continued)

FOREIGN PATENT DOCUMENTS

| | | |
|---|---|---|
| EP | 2068245 B1 | 3/2011 |
| JP | 10078853 A | 3/1998 |
| JP | 2002185438 A | 6/2002 |
| JP | 2005085121 A | 3/2005 |

(Continued)

*Primary Examiner* — John J Tabone, Jr.
(74) *Attorney, Agent, or Firm* — Griffiths & Seaton PLLC (57) ABSTRACT

For facilitating data verification using a checksum in conjunction with a sidefile by a processor device in a computing environment, first block signatures having a first size are calculated for first blocks of a first volume stored on a storage device. The first block signatures are stored to a sidefile. Second block signatures having a second size different from the first size are calculated for second blocks of a second volume stored on the storage device. The second block signatures are stored to the sidefile.

9 Claims, 5 Drawing Sheets

| U.S. PATENT DOCUMENTS | | | | FOREIGN PATENT DOCUMENTS | | |
|---|---|---|---|---|---|---|
| 2007/0226588 | A1 | 9/2007 | Lee et al. | WO | 9937030 | 7/1999 |
| 2008/0178061 | A1* | 7/2008 | Mead .......................... 714/766 | WO | 2004086648 | 10/2004 |
| 2008/0256419 | A1* | 10/2008 | Wojewoda et al. ........... 714/766 | WO | 2010142634 | 12/2010 |
| 2009/0089646 | A1* | 4/2009 | Hirose et al. .................. 714/766 | | | |
| 2010/0318887 | A1 | 12/2010 | Zvibel | | | |

* cited by examiner

DATA VERIFICATION USING CHECKSUM SIDEFILE

CROSS-REFERENCE TO RELATED APPLICATION

This application is a Continuation of U.S. patent application Ser. No. 13/224,176, filed Sep. 1, 2011, which is related to U.S. patent application Ser. No. 12/481,953 "Data Verification Using Checksum Sidefile", filed 10 Jun. 2009, which is incorporated herein by reference.

FIELD OF THE INVENTION

The present invention relates in general to computers, and more particularly to a method, system, and computer program product for facilitating data verification using a checksum in conjunction with a sidefile in data processing computer storage subsystems.

BACKGROUND OF THE INVENTION

A checksum or hash sum is a fixed-size datum computed from an arbitrary block of digital data for the purpose of detecting errors that may have been introduced during its transmission or storage. The integrity of the data may be checked at any time by recomputing the checksum and comparing it with the stored checksum. If the checksums do not match, the data is determined to be altered.

In data processing computer storage subsystems, a storage controller often computes a checksum signature such as a Cyclic Redundancy Check (CRC). A CRC is an error-detecting code. Its computation resembles a long division operation in which the quotient is discarded and the remainder becomes the result, with the important distinction that the arithmetic used is the carry-less arithmetic of a finite field. The length of the remainder is always less than or equal to the length of the divisor, which therefore determines how long the result can be. The definition of a particular CRC specifies the divisor to be used, among other things.

SUMMARY OF THE INVENTION

Storage controllers typically place checksum signatures such as CRCs near the stored data, for example on the same nonvolatile storage media as the stored data. As a result, if the data becomes corrupted, the error may not be detectable by the CRC. For example, situations may arise where a write of data and/or the corresponding CRC does not occur (the data is not written). In such a case, the next read of this data will read the old data and/or the old CRC, and the system may determine that the old data and/or CRC are valid. In view of the foregoing, a need exists for a mechanism whereby checksum signatures such as CRCs may be retained, yet in a storage location apart from the stored data.

There is provided, in accordance with an embodiment of the present invention a method, including calculating, for first blocks of a first volume stored on a storage device, first block signatures having a first size, storing the first block signatures to a sidefile, calculating, for second blocks of a second volume stored on the storage device, second block signatures having a second size different from the first size, and storing the second block signatures to the sidefile.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only exemplary embodiments of the invention and are not therefore to be considered to be limiting of its scope, the invention will be described and explained with additional specificity and detail through the use of the accompanying drawings, in which.

DETAILED DESCRIPTION

The illustrated embodiments below provide mechanisms for data verification using a sidefile storage device as a memory location to store checksum signature information in lieu of placing the checksum signatures in close proximity to the stored data. Such a sidefile may be implemented using a small, high-performance and zero-seek time storage device, such as a solid-state drive (SSD) or flash memory device. Alternatively, the sidefile can comprise a disk drive. The sidefile establishes a memory location in addition to the nonvolatile memory location in which the stored data is located. Accordingly, each checksum is recorded in the sidefile instead of being recorded on the storage controller disks. As a result, if data is never written to disk, the corresponding checksum is still written to the sidefile location. The associated error established by the stored checksum is thus ensured to be discovered.

In some embodiments, the sidefile can store various types of checksum signatures (also referred to herein as data integrity fields (DIFs) or block signatures) for different volumes. For example, the sidefile can store a four bit CRC signature for a first volume and a two byte CRC signature for a second volume. Additionally, since the signatures are stored separately on the sidefile, the strength (i.e., size) of block signatures for a specific volume can be changed while the volume is active. For example, if a volume uses a four bit CRC signature while in testing mode, and the volume is ready for migration to production mode, the block signature for the volume can be changed by storing, on the sidefile, two byte CRC signatures for each block of the volume.

Another example of a block signature that can be used by embodiments of the present invention is the T10-DIF, defined by the T10 Technical Committee of the InterNational Committee for Information Technology Standards (INCITS), which is responsible for standardization of the Small Computer System Interface (SCSI) storage protocol. The T10-DIF supports end-to-end data protection in storage networks. This DIF is appended to each SCSI data block (also referred to as a sector and typically, although not necessarily, 512 bytes in size). It comprises eight bytes including a 16-bit "Block Guard" cyclic redundancy code (CRC), a 16-bit "Application Tag," and a 32-bit "Reference Tag," which is incremented to ensure that blocks are maintained in the proper order.

The SCSI DIF is just one well-known type of data integrity field, and many other examples exist. In the context of the present patent application and in the claims, the term "block signature" should be understood as referring generally to any data field that is computed over and associated with a block of data and can then be used in verifying that the data in the block has not been corrupted. The block signature can either be appended to its associated block of data, or stored in another location. Verifying a block signature (i.e., when reading a data block) ensures that that the data block was not altered since the data block was stored and its block signature was calculated and stored.

Figure 1:
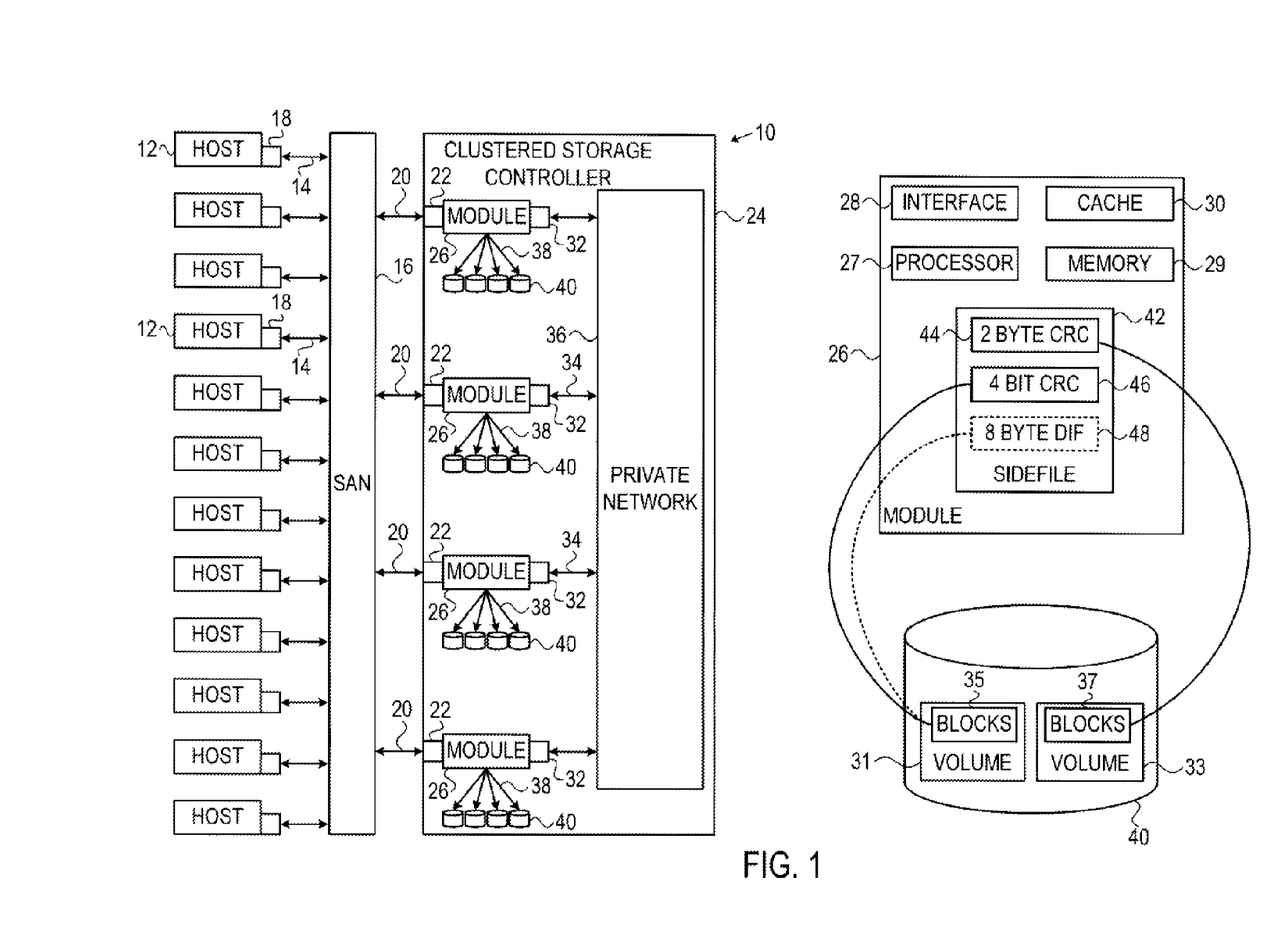
FIG. 1 is a block diagram of an exemplary computing environment including a data processing storage subsystem in which various aspects of the following description and claimed subject matter may be implemented.

Turning now to the drawings, reference is initially made to FIG. 1, which is a block diagram of an exemplary data processing storage subsystem 10, in accordance with a disclosed embodiment of the invention. The particular subsystem shown in FIG. 1 is presented to facilitate an explanation of the invention. However, as the skilled artisan will appreciate, the invention can be practiced using other storage subsystems with diverse architectures and capabilities.

The storage subsystem 10 receives, from one or more host computers 12, input/output (I/O) requests, which are commands to read or write data at logical addresses on logical volumes. Any number of host computers 12 are coupled to the storage subsystem 10 by any means known in the art, for example, using a network. Herein, by way of example, the host computers 12 and the storage subsystem 10 are assumed to be coupled by a storage area network (SAN) 16 incorporating data connections 14 and host bus adapters (HBAs) 18. The logical addresses specify a range of data blocks within a logical volume, each block herein being assumed by way of example to contain 512 bytes. For example, a 10 KB data record used in a data processing application on a host computer would require 20 blocks, which the host computer might specify as being stored at a logical address comprising blocks 1000 through 1019 of a logical volume. The storage subsystem 10 typically operates in, or as, a network attached storage (NAS) or a SAN 16.

The storage subsystem 10 comprises a clustered storage controller 24 coupled between the SAN 16 and a private network 36 using data connections 20 and 34, respectively, and incorporating adapters 22 and 32, again respectively. Clustered storage controller 24 implements clusters of storage modules 26, each of whom includes a processor 27, an interface 28 (in communication between adapters 22 and 32), a memory 29, a cache 30 and a sidefile 42. Sidefile 42 is discussed in further detail hereinbelow. Each storage module 26 is responsible for a number of storage devices (e.g., disks) 40 by way of data connection 38 as shown.

In the example shown in FIG. 1, a given disk 40 stores a first volume 31 and a second volume 33. Volume 31 comprises first blocks 35 and volume 33 comprises second blocks 37. In the example shown in FIG. 1, processor 38 calculates four bit CRC signatures 46 (also referred to herein as first signatures 46) for blocks 35, and stores first signatures 46 to sidefile 42. Processor 38 also calculates two byte CRC signatures 44 (also referred to herein as second signatures 44) for blocks 37, and stores second signatures 44 to sidefile 42.

There may be times when a system administrator (not shown) decides to either strengthen or weaken a signature associated with a particular volume. Typically, longer signatures are stronger that shorter signatures. For example, if the status of volume 31 is migrated from development to production, the system administrator may convey a request to processor 27 to now implement an eight byte T10-DIF for each of blocks 33. Upon receiving the request, processor 27 calculates T10-DIF signatures 48 (also referred to herein as subsequent signatures 48) for blocks 33 and stores subsequent signatures 48 to sidefile 42.

As described previously, each storage module 26 comprises cache 30. However, it will be appreciated that the number of caches used in the storage subsystem 10 and in conjunction with clustered storage controller 24 may be any convenient number. While all caches 30 in the storage subsystem 10 may operate in substantially the same manner and to comprise substantially similar elements, this is not a requirement. Each of the caches is typically, but not necessarily approximately equal in size and is assumed to be coupled, by way of example, in a one-to-one correspondence with a set of physical storage units, which are typically disks. In one embodiment, disks 40 may comprise such disks. Those skilled in the art will be able to adapt the description herein to caches of different sizes, and to caches and storage devices in other correspondences, such as the many-to-many correspondence described in U.S. Patent Application Publication No. 2005/0015566, entitled "Data Allocation in a Distributed Storage System," which is assigned to the assignee of the present invention and which is incorporated herein by reference. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

Each set of the physical storage units comprises multiple slow and/or fast access time mass storage devices, herein below assumed to be multiple hard disks. FIG. 1 shows caches 30 coupled to respective sets of the physical storage units. Typically, the sets of physical storage units comprise one or more disks 40, which can have different performance characteristics. In response to an I/O command, the cache 30, by way of example, may read or write data at addressable physical locations of the physical storage unit. In the embodiment of FIG. 1, the caches 30 are shown to exercise certain control functions over the physical storage unit. These control functions may alternatively be realized by hardware devices such as disk controllers, which are linked to the caches 30.

In an embodiment of the present invention, the routing of logical addresses is implemented according to methods described in the above-referenced U.S. Patent Application Publication No. 2005/0015566. Routing records, indicating the association of logical addresses of logical volumes with partitions and the association of the partitions with caches, are distributed by the SAN 16 to one or more generally similar network interfaces 28 of the storage modules 26. It will be understood that the storage subsystem 10, and thereby, the clustered storage controller 24, may comprise any convenient number of network interfaces 28. Subsequent to the formation of disks 40, network interfaces 28 receive I/O commands from host computers 12 specifying logical addresses of disks 40. The network interfaces use the routing records to break the commands into I/O instructions, or command subsets, that are then distributed among caches 30.

Each storage module 26 is operative to monitor its state, including the states of associated caches 30, and to transmit configuration information to other components of storage subsystem 10, for example, configuration changes that result in blocking intervals, or limit the rate at which I/O requests for the sets of physical storage are accepted, as explained in further detail herein below.

Routing of commands and data from HBAs 18 to the clustered storage controller 24 to each cache 30 is typically performed over a network and/or a switch. Herein, by way of example, HBAs 18 may be coupled to storage modules 26 by at least one switch (not shown) of the SAN 16 which can be of any known type having a digital cross-connect function. In additional implementations, HBAs 18 may be directly connected to the storage modules 26.

Data having contiguous logical addresses are generally distributed among disks 40. This can be accomplished using the techniques disclosed in the above-referenced U.S. Patent Application Publication No. 2005/0015566. Alternatively, the data can be distributed using other algorithms, e.g., byte or block interleaving. In general, this increases bandwidth, for instance, by allowing a volume in a SAN or a file in network attached storage to be read from or written to more than one disk at a time. However, this technique requires coordination among the various disks, and in practice may require complex provisions for disk failure, and a strategy for dealing with error checking information, e.g., a technique for storing parity information relating to distributed data. Indeed, when logical unit partitions are distributed in sufficiently small granularity, data associated with a single logical unit may span all of disks 40.

While not explicitly shown for purposes of illustrative simplicity, the skilled artisan will appreciate that in some embodiments, clustered storage controller 24 may be adapted for implementation in conjunction with certain hardware, such as a rack mount system, a midplane, and/or a backplane. Indeed, private network 36 in one embodiment may be implemented using a backplane. Additional hardware such as the aforementioned switches, processors, controllers, memory devices, and the like may also be incorporated into clustered storage controller 24 and elsewhere within storage subsystem 10, again as the skilled artisan will appreciate. Further, a variety of software components, operating systems, firmware, and the like may be integrated.

Each storage module 26 in the clustered storage controller 24 includes a sidefile 42. As previously mentioned, sidefile 42 may include such storage devices as a low latency disk drive, a solid-state drive (SSD) storage device or a flash memory device such as a Compact Flash (CF) storage device. The storage capacity of sidefile 42 is not required to be nearly as large as that of nonvolatile storage disks 40 as the checksums associated with stored write data are correspondingly small in comparison (typically a few bytes). As a result, a small, high-performance device may be implemented in conjunction with each storage module in a cost effective manner.

While the illustrated embodiment shows sidefiles 42 associated with each storage module 26, the skilled artisan will appreciate that other embodiments may implement sidefiles 42 in differing ways. For example, a single sidefile device may store checksum information for data stored in a number of volumes associated with a number of storage modules.

Processor 27 typically comprises a general-purpose computer configured to carry out the functions described herein. Software operated by the processor may be downloaded to a the memories in electronic form, over a network, for example, or it may be provided on non-transitory tangible media, such as optical, magnetic or electronic memory media. Alternatively, some or all of the functions of the processor may be carried out by dedicated or programmable digital hardware components, or by using a combination of hardware and software elements.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Variable Strength Sidefile Signatures

FIGS. 2A-2C, and 3, following depict exemplary methods for implementing sidefile mechanisms to improve data verification. As one skilled in the art will appreciate, various steps in the methods may be implemented in differing ways to suit a particular application.

Figure 2A:
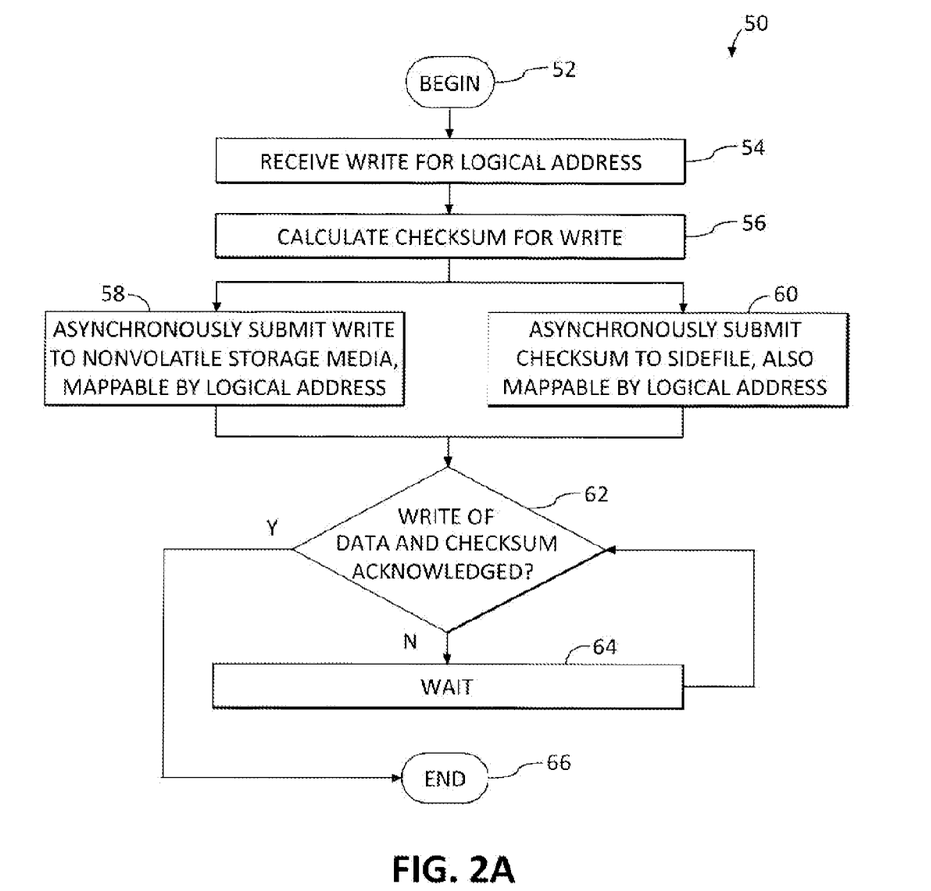
FIG. 2A is a flow chart diagram of an exemplary method for submitting a checksum signature to a sidefile.

Turning to FIG. 2A, reference is made to an exemplary method 50 for performing data writes implementing the sidefile device illustrated in FIG. 1, previously. Method 50 begins (step 52) with a write being received for a certain logical address (step 54). A data integrity field (DIF) is calculated by the system for the write (step 56). The write is asynchronously submitted to nonvolatile storage media, mappable by the logical address (step 58). In addition, the checksum is asynchronously submitted to the sidefile to be recorded (step 60). Both steps 58 and 60 occur asynchronously with each other so as to allow for increased system performance. The checksum signature is also mappable by logical address. Method 50 queries whether the write of the data and the checksum signature have been acknowledged (step 62). If no, the system waits (step 64) until this is the case. The method 50 then ends (step 66).

As discussed supra, sidefile 42 may store different DIFs for different volumes on storage device 40. In other words, processor 27 can perform the steps of method 50 for two different volumes, where each volume may implement a different DIF.

For example, for first volume 31, processor 27 can calculate first signatures 46 having a first size (e.g., a four bit CRC) for each first block 35, store the first signatures to sidefile 42, and associate the first signatures with the first blocks. Additionally, for second volume 33, processor 27 can calculate second signatures 44 for each second block 37, the second signatures having a second size different from the first size (e.g., a two byte CRC), and store the second signatures to sidefile 42.

Alternatively, sidefile 42 can change the protection level for a particular volume by changing the DIF associated with the particular volume. In other words, processor 26 can initially perform the steps of method 50 to implement a first DIF for the particular volume, and then at a subsequent time, perform steps of method 50 to replace the first DIF with a second DIF.

Continuing the example from above, at some point after calculating and storing first signatures 46, processor 27 can calculate subsequent signatures 48 (e.g., an eight byte T10-DIF) for each first block 35, the subsequent signatures having an alternate size different from the first size, and then store the alternate signatures to sidefile 42. Upon storing subsequent signatures 48 to sidefile 42, processor 27 can then associate the subsequent signatures with first blocks 35 (i.e., volume 31), and then delete the first signatures 46 from the sidefile.

While the configuration of storage subsystem 10 shown in FIG. 1 shows sidefile 42 as a storage device storing signatures 44, 46 and 48, other configurations may be implemented for sidefile 42, and are considered to be within the spirit and scope of the present invention. For example, sidefile 42 may be implemented as a region (e.g., a file or a volume) on a second storage device (not shown) in storage subsystem 10, where the region is configured to store the signatures for the volumes. Additionally or alternatively, processor 27 may be configured to calculate and store different DIFs for different volumes, and configured to change (i.e., replace) a DIF for a specific volume, as described supra.

Figure 2B:
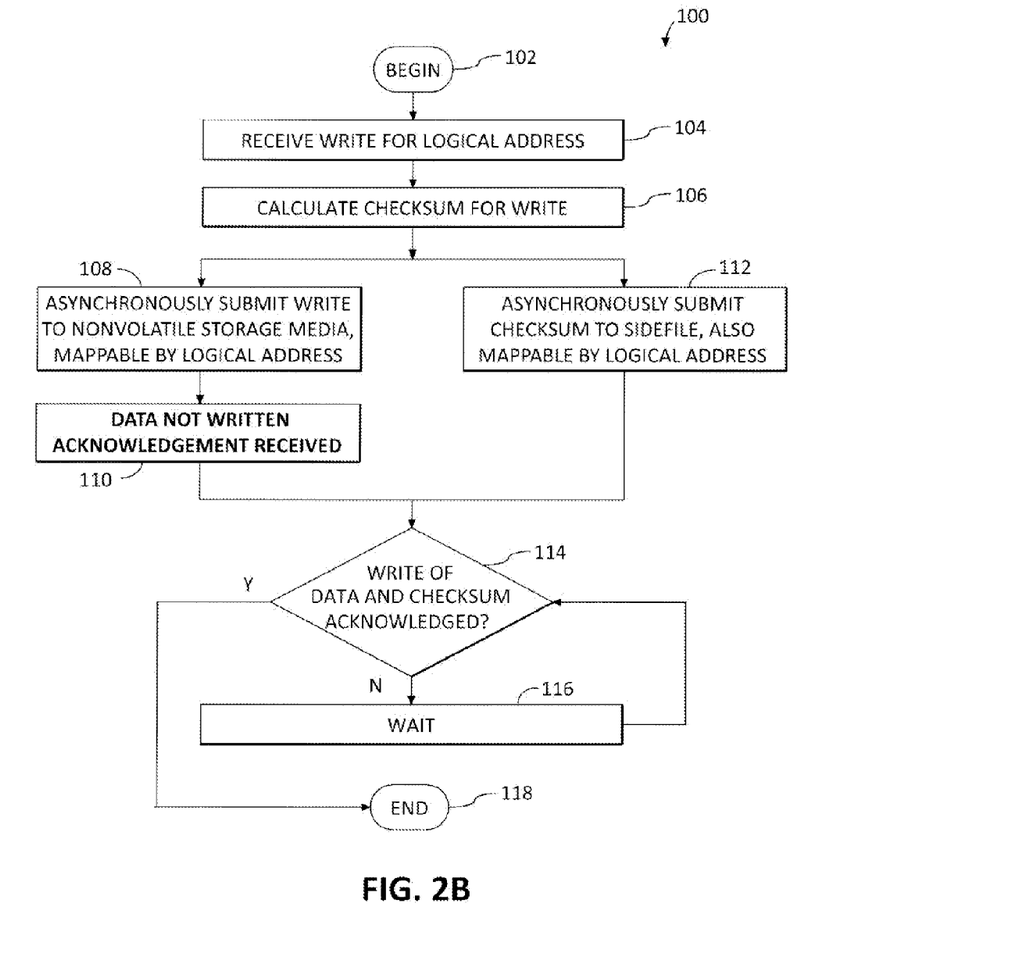
FIG. 2B is a flow chart diagram of an exemplary method of writing data wherein a data error results.
Figure 2C:
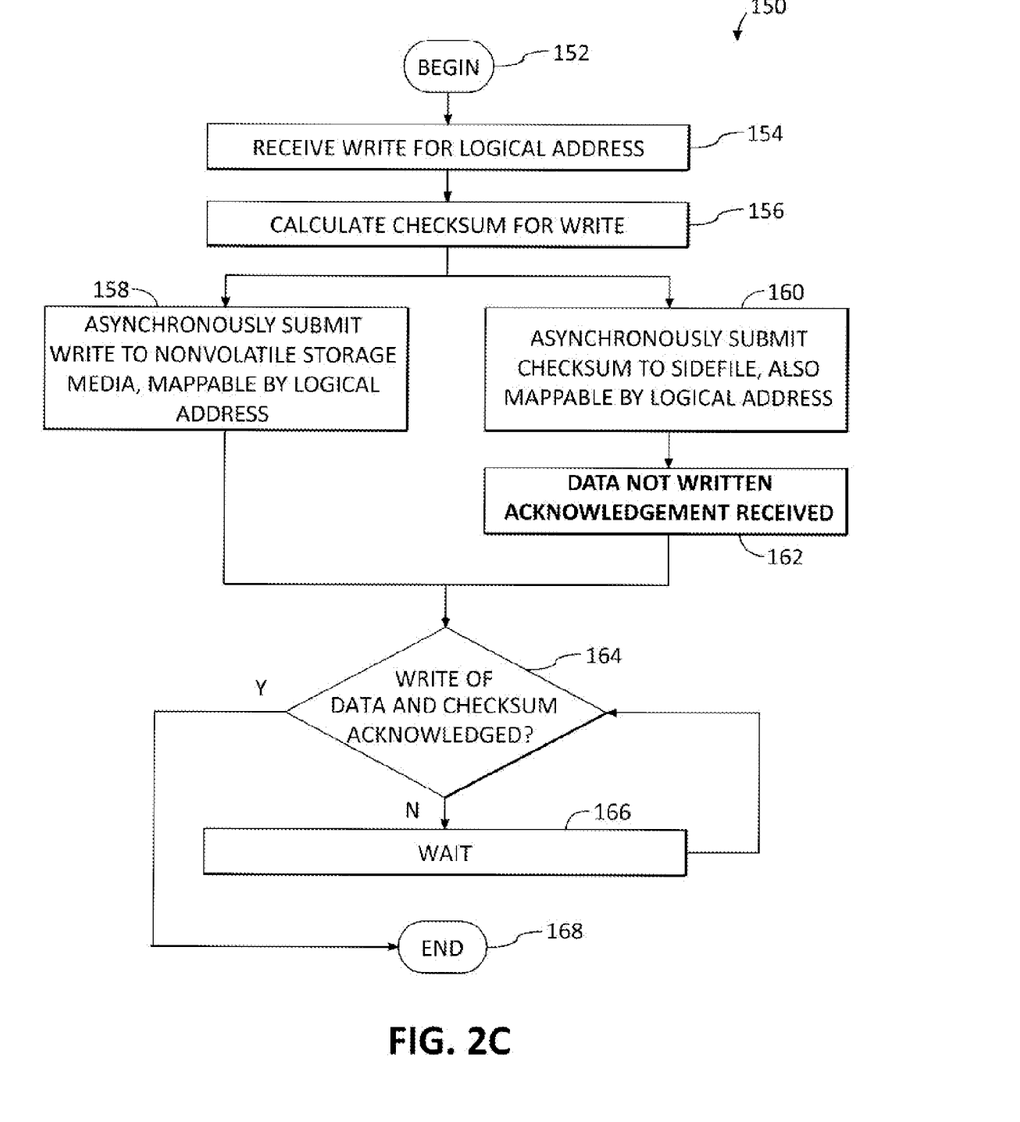
FIG. 2C is a flow chart diagram of an exemplary method of writing data wherein an additional data error results.

Turning now to FIGS. 2B and 2C, reference is made to an exemplary methods for writing data in which a data error occurs. In both exemplary methods, the data errors may be not discoverable but for the mechanisms of the present invention implementing the sidefile device previously described. Turning first to FIG. 2B, method 100 begins (step 102) with a write received for a logical address (step 104). The applicable checksum is calculated for the write (step 106), and the write is asynchronously submitted to the nonvolatile storage media, mappable by the logical address (step 108). In the present example however, the data is not written, yet an acknowledgement is received (step 110). Asynchronous with the write of the data, the checksum signature is submitted to the sidefile for storage (again mappable by the logical address) (step 112). The system waits until the writes of both data and checksum are acknowledged (steps 114, 116), and then the method 100 ends.

Turning now to FIG. 2C, method 150 begins (step 152) with a write received for a logical address (step 154). The applicable checksum is calculated for the write (step 156), and the write is asynchronously submitted to the nonvolatile storage media, mappable by the logical address (step 158). Asynchronous with the write of the data, the checksum signature is submitted to the sidefile for storage (again mappable by the logical address) (step 160). Subsequent to the submittal of the checksum signature, and in similar fashion to the previous example, the data is not written, yet an acknowledgement is received that the data was written (step 162). The system waits until the writes of both data and checksum are acknowledged (steps 164, 166), and then the method 150 ends.

Figure 3:
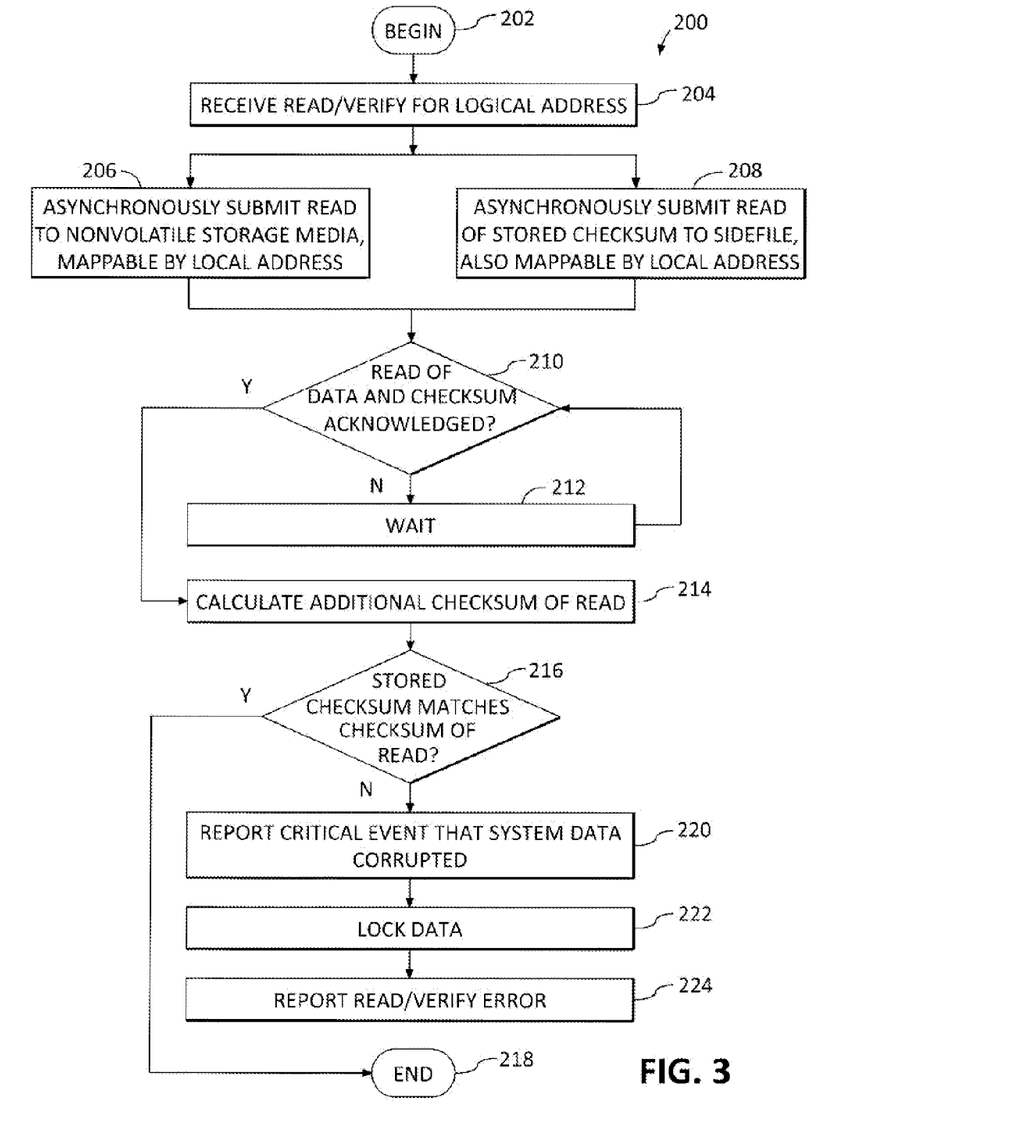
FIG. 3 is a flow chart diagram of an exemplary method for verifying data using a checksum signature submitted to a solid-state sidefile memory location according to the present invention.

Turning now to FIG. 3, an exemplary method 200 for data verification using the sidefile mechanisms previously described is now shown. Method 200 allows for the detection of data errors resulting from either of the previous examples set forth in FIGS. 2B and 2C, where write errors prevent data from being written, yet an acknowledgement is received that the data was written. Method 200 begins (step 202) with the receipt of a read/verify instruction for a logical address (step 204). The read is asynchronously submitted to the nonvolatile storage media, mappable by the logical address (step 206) while the read of the stored checksum, also mappable by the logical address, is asynchronously submitted to the sidefile location (step 208).

As a next step, the method 200 queries whether the read of data and checksum signature information is acknowledged (step 210), and waits (step 212) until this is the case. Next, an additional checksum signature is calculated for the read of data (step 214). The stored checksum is then compared against the checksum calculated for the read (step 216). If the two checksums match, then the data is verified and the method 200 ends (step 218). If not, then a critical event that system data has been corrupted is reported (step 220). The corrupted data is locked (step 222), and a read/verify error is reported (step 224). The method 200 ends (again, step 218).

Use of a sidefile location in conjunction with a storage controller to store checksum signature information provides an efficient and effective mechanism to improve data reliability in storage subsystems.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

What is claimed is:

1. A method of creating a mechanism for facilitating verification of data using a processor device in a computing environment, the method comprising:
    calculating, for first blocks of data from a first volume of data stored on a storage device, first block signatures having a first size, the first size comprising bytes or bits indicating a first signature strength;
    storing the first block signatures to a sidefile;
    calculating, for second blocks of data from a second volume of data stored on the storage device, second block signatures having a second size different from the first size, the second size being greater than the first size and comprising bytes or bits indicating a second signature strength that is stronger than the first signature strength; and
    storing the second block signatures to the sidefile.

2. The method of claim 1, wherein at least one of the first and second block signatures is submitted to the sidefile asynchronously with a write operation.

3. The method of claim 1, wherein the first and the second block signatures include one of a cyclic redundancy check and a T-10 data integrity field.

4. The method of claim 1, wherein the sidefile comprises the storage device.

5. The method of claim 1, wherein the storage device includes at least one of a compact flash drive, a solid-state drive, and a hard disk drive.

6. The method of claim 1, wherein the sidefile comprises a region on the storage device.

7. The method of claim 1, further comprising verifying a read of data from the first volume of data by calculating an additional block signature of the data and comparing the additional block signature to the first block signatures, wherein if the additional block signature and the first block signatures match, then the data is verified.

8. The method of claim 7, further comprising, if the additional block signature and the first block signatures do not match, then reporting that system data has been corrupted.

9. The method of claim 1, further comprising:
    calculating, for the first blocks of the first volume of data, third block signatures having a third size, the third size comprising bytes or bits indicating a third signature strength that is stronger than the first signature strength;
    storing the third block signatures to the sidefile;
    associating the third block signatures to the first blocks of the first volume of data; and
    deleting the first block signatures from the sidefile.

* * * * *